(12) United States Patent
Avalos Sartorio et al.

(10) Patent No.: US 10,519,993 B2
(45) Date of Patent: Dec. 31, 2019

(54) APPARATUS AND METHODS FOR JOINING ARTICLES

(71) Applicant: Air Design SA de CV, Tlalnepantla (MX)

(72) Inventors: Carlos Avalos Sartorio, Tlalnepantla (MX); Miguel Avalos Sartorio, Tlalnepantla (MX)

( * ) Notice: Subject to any disclaimer, the term of this patent is extended or adjusted under 35 U.S.C. 154(b) by 463 days.

(21) Appl. No.: 14/931,425

(22) Filed: Nov. 3, 2015

(65) Prior Publication Data
US 2016/0121812 A1 May 5, 2016

Related U.S. Application Data

(60) Provisional application No. 62/122,953, filed on Nov. 3, 2014.

(51) Int. Cl.
| | |
|---|---|
| *F16B 5/02* | (2006.01) |
| *F16B 5/00* | (2006.01) |
| *B62D 27/06* | (2006.01) |
| *B62D 25/16* | (2006.01) |
| *B62D 35/00* | (2006.01) |
| *F16B 47/00* | (2006.01) |

(52) U.S. Cl.
CPC .............. *F16B 5/02* (2013.01); *B62D 27/065* (2013.01); *F16B 5/0024* (2013.01); *F16B 5/0088* (2013.01); *F16B 47/003* (2013.01); *B62D 25/163* (2013.01); *B62D 35/007* (2013.01)

(58) Field of Classification Search
CPC .. B62D 25/163; B62D 27/065; B62D 35/007; F16B 5/0024; F16B 5/0088; F16B 5/02; F16B 5/0208; F16B 5/0258; F16B 5/065; F16B 11/00; F16B 11/006; F16B 47/003; Y10T 403/3986; Y10T 403/47; Y10T 403/471; Y10T 403/475; Y10T 403/645
USPC .................. 403/200, 265, 266, 269, 337
See application file for complete search history.

(56) References Cited

U.S. PATENT DOCUMENTS

| | | | | |
|---|---|---|---|---|
| 5,017,328 A | * | 5/1991 | Mazurek | F16F 1/3713 248/560 |
| 5,249,836 A | * | 10/1993 | Stanesic | B62D 35/007 296/180.1 |
| 5,295,755 A | * | 3/1994 | DeHaan, III | F16B 47/003 403/266 |
| 5,314,280 A | * | 5/1994 | Gagliardi | B62D 25/163 29/525.02 |
| 6,241,302 B1 | * | 6/2001 | Rehkopf | B62D 35/007 296/152 |
| 6,727,466 B2 | * | 4/2004 | Hutter, III | F16B 11/006 156/71 |

(Continued)

*Primary Examiner* — Josh Skroupa
(74) *Attorney, Agent, or Firm* — Wood Herron & Evans LLP

(57) ABSTRACT

A fixation assembly for affixing a first object to a second object, such as for affixing a component to the surface of a vehicle, includes an insert body and an enclosure at least partially surrounding the inset body. The insert body has a threaded bore, and the enclosure defines a mounting surface for mounting the fixation assembly on the surface of the vehicle. An adhesive disposed on the mounting surface facilitates bonding the fixation assembly to the surface without requiring holes to be drilled in the vehicle. The fixation assembly may further include a fastener having external threads complementary to the threaded bore.

5 Claims, 6 Drawing Sheets

(56) References Cited

U.S. PATENT DOCUMENTS

| | | | | |
|---|---|---|---|---|
| 7,815,988 B2 * | 10/2010 | Stumpf | ................ | F16B 11/006 |
| | | | | 428/40.1 |
| 9,089,961 B2 * | 7/2015 | Fleck | ....................... | B25G 3/00 |
| 2003/0147714 A1 * | 8/2003 | Yu | ........................ | F16B 11/006 |
| | | | | 411/82 |

* cited by examiner

APPARATUS AND METHODS FOR JOINING ARTICLES

CROSS-REFERENCE

This application claims the benefit of prioirity to U.S. Provisional Patent Application Ser. No. 62/122,953 filed Nov. 3, 2014 (pending), the disclosure of which is expressly incorporated by reference herein in its entirety.

TECHNICAL FIELD

The present invention relates generally to apparatus and methods for joining articles and, more particularly, to methods and systems for affixing accessories, body parts, or other components onto a surface of an automobile or any other type of vehicle.

BACKGROUND

Conventional fastening methods for assembling aftermarket vehicle personalization accessories onto an automobile or other vehicle usually involve the use of screws, tin screws, or push pins that require drilling of the vehicle's sheet metal and plastic surfaces. While these hard fastening techniques may be adequate for attaching original equipment components that are installed at automobile assembly plants with the intensive use of predrilled and chemically treated fastening points that avoid rust on the vehicle sheet metal, these factory fixation methods and systems are not generally satisfactory for retailing aftermarket accessories that are typically installed directly by dealerships, retailers, or body shops outside the automotive assembly plants. Specifically, drilling holes in a vehicle's exterior surface to facilitate fastening specialty accessories often results in the sheet metal of the vehicle being left with minimum or inadequate weathering protection, which may cause severe rust and surfaces damage, possibly voiding a vehicle's factory warranty and a leaving vehicle owner's with expensive repair costs.

The use of double-sided adhesive tape is another example of a conventional fastening system that has been used for vehicle personalization components. The use of double-sided adhesive tape without any mechanical support at points of contact and stress results in a poor and fragile fastening support method for large and rigid components, particularly when components are installed on surfaces without proper cleaning and when components are exposed to extreme weather conditions. Moreover, double-sided adhesive tape cannot generally be used for vacuum formed or hand laid fiberglass accessories that lack an interior flat smooth surface that is necessary to mount the adhesive tape. A need therefore exists for systems and methods for mechanically fastening exterior accessories and other components onto vehicles in a robust and permanent way, without having to drill the sheet metal or other surfaces of the vehicle in order to avoid rust and body damage. It is an object of the present invention to provide a system and method for the proper, safe and permanent installation of vehicle personalization and utility accessories within the fast growing, innovative and very dynamic specialty equipment automotive industry.

SUMMARY

In one aspect, a system and method in accordance with the present disclosure includes a threaded insert inside a molded flexible polymer enclosure with a self adhesive bottom that sticks onto any section of the sheet metal of a vehicle, adapting to curved surfaces and minimizing vibration effects, allowing other parts or accessories to be fastened onto the vehicles exterior and interior panels without drilling. When applied to new specialty aftermarket and original equipment manufacturer (OEM) accessories, the inventive removable fixation system enables development and new applications for a new generation of innovative vehicle personalization accessories close to factory fastening specifications.

In accordance with the principles of the present disclosure, systems and methods are provided which facilitate the fixation of exterior or interior car components using a removable fixation system whereby adjacent components and accessories may be screwed to a vehicle surface without requiring holes to be drilled. For example, a fixation system in accordance with the invention facilitates mechanically attaching accessories and components such as fender flares, door cladding, door moldings, body panels, rocker panels, consoles, electronic components, among others, onto vehicle exterior and/or interior surfaces, adapting to curved surfaces without having to drill the original surfaces and sheet metal of the vehicle. A fixation system in accordance with the present disclosure provides a novel design that allows safe, permanent, and robust fastening of small, medium, and large-sized molded parts formed from plastic or other materials onto a vehicle's smooth, sheet metal surfaces while avoiding rust, vibrations, or damage, and which may be used in all weather conditions.

In one aspect, a fixation assembly for affixing a first object to a second object, such as for affixing a component to the surface of a vehicle, includes an insert body and an enclosure at least partially surrounding the inset body. The insert body has a threaded bore, and the enclosure defines a mounting surface for mounting the fixation assembly on the surface of the vehicle. An adhesive disposed on the mounting surface facilitates bonding the fixation assembly to the surface without requiring holes to be drilled in the vehicle. The fixation assembly may further include a fastener having external threads complementary to the threaded bore.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
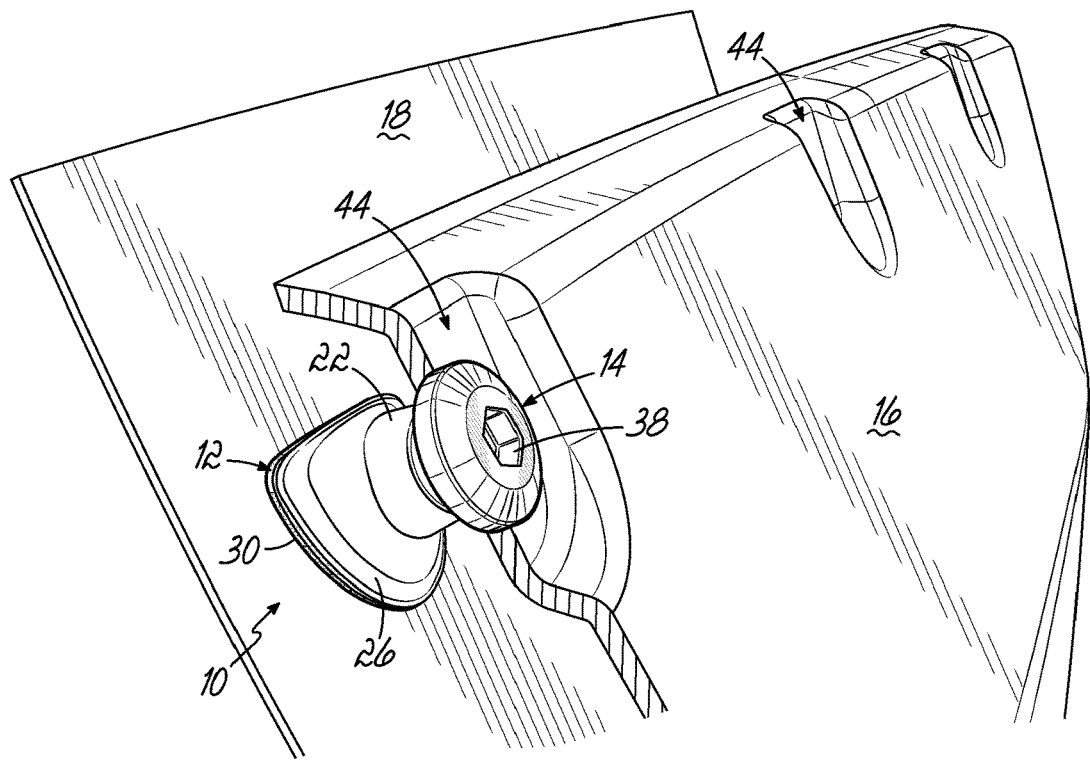
FIG. 1 is a perspective view of an exemplary fixation assembly in accordance with the principles of the present disclosure, illustrated in use to mount an accessory to the surface of a vehicle.
Figure 2:
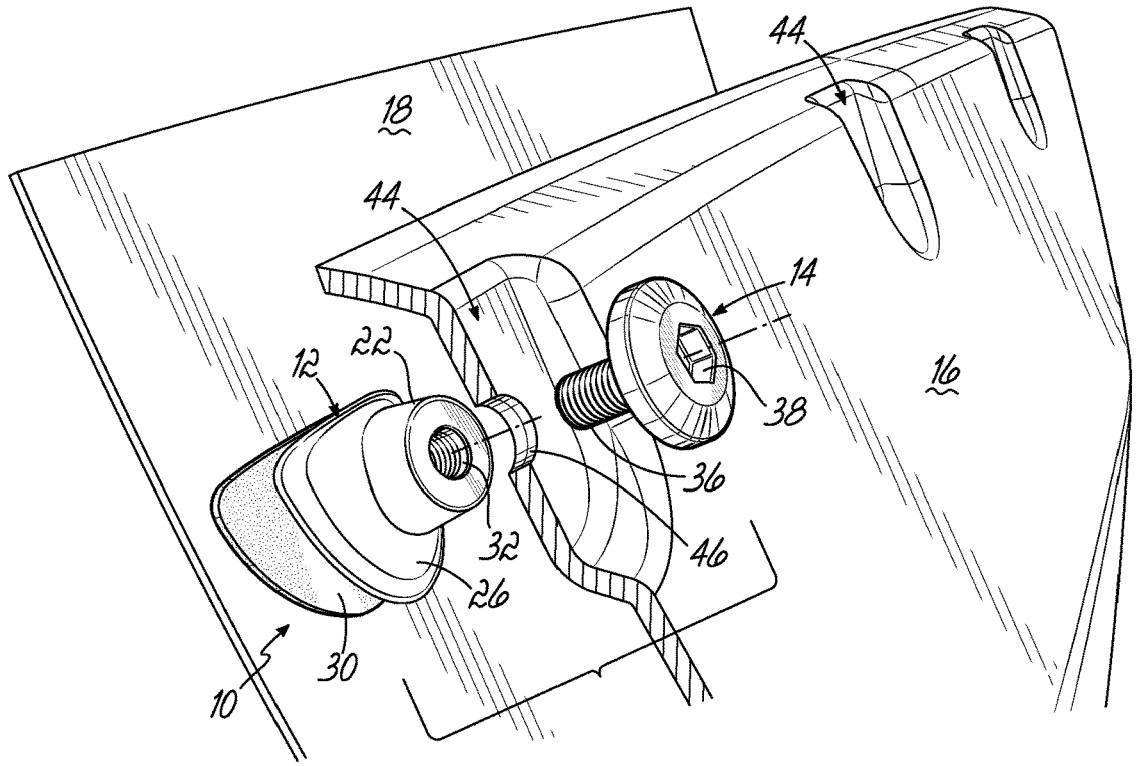
FIG. 2 is a perspective view similar to FIG. 1, depicting an exploded view of the exemplary fixation assembly.
Figure 3:
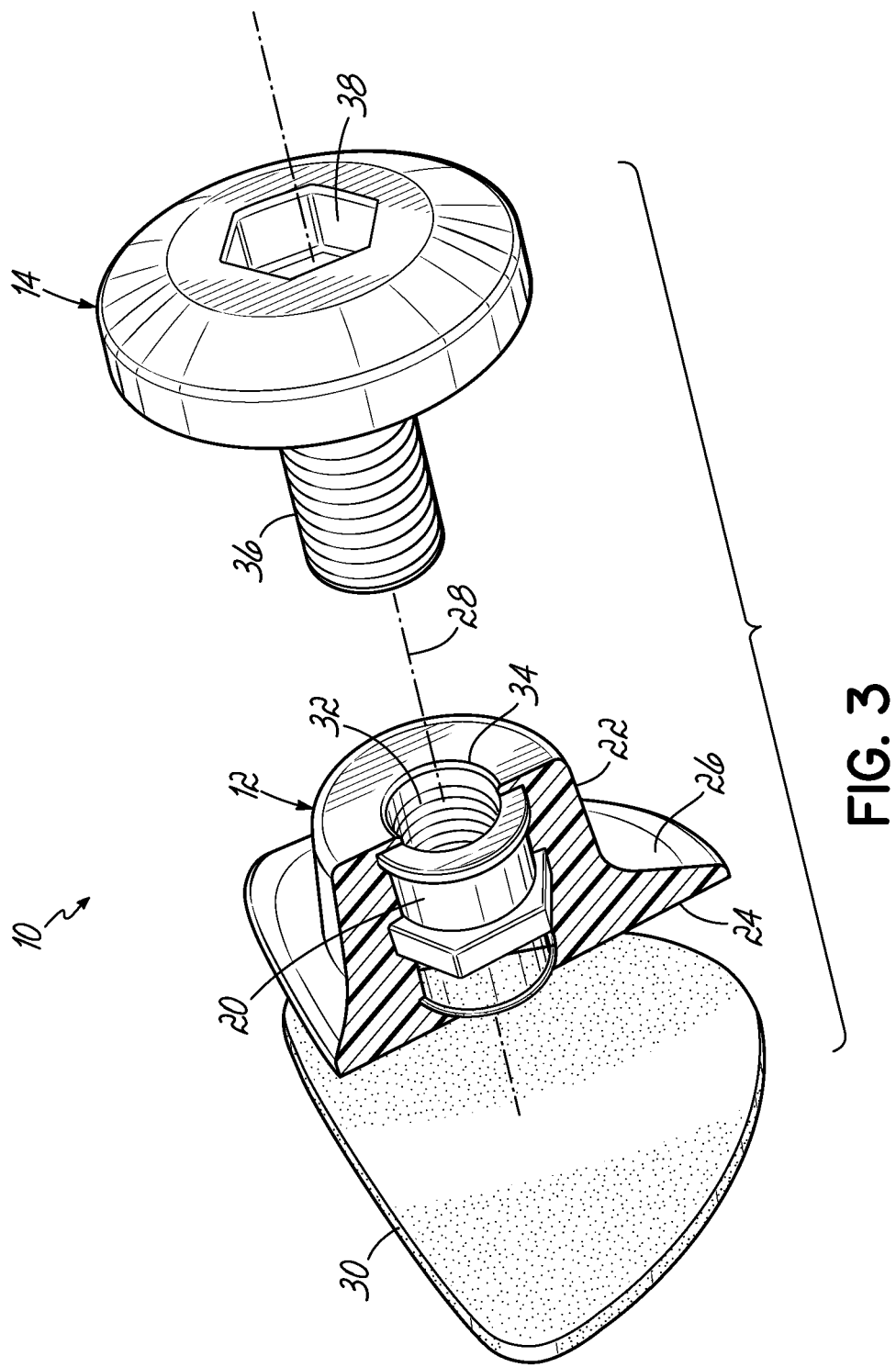
FIG. 3 is an exploded detail view of the fixation assembly of FIG. 2.

FIGS. 1-3 illustrate an exemplary fixation assembly 10 for affixing a first article to a second article, and more particularly for affixing components to the interior or exterior surfaces of a vehicle. In the embodiment shown, the fixation assembly 10 includes a mounting base 12 and a fastener 14. In the illustrated embodiment, the fixation assembly 10 is used to affix an automotive component 16 (depicted here in the form of a fender flare) to the surface 18 of a portion of a vehicle, however, it will be appreciated that a fixation assembly 10 in accordance with the present disclosure may alternatively be used to join various other articles where it is desired to affix one article to the surface of another article without the need to drill holes.

FIG. 3 illustrates an exploded cross-sectional view of the fixation assembly 10 of FIGS. 1 and 2. In this embodiment, the mounting base 12 comprises an insert body 20 encased substantially within an enclosure 22. The enclosure 22 comprises a polymeric material that is molded around the insert body 20, thereby mechanically interlocking the insert body 20 with the enclosure 22. The enclosure 22 defines a mounting surface 24 for coupling the mounting base 12 to the surface 18 of the vehicle. In the embodiment shown, the mounting surface 24 is provided on the distal face of a flange 26 that extends radially outwardly from a central axis 28 of the mounting base 12. The flange 26 of the mounting base 12 may be suitably resilient to allow the mounting surface 24 to conform to curved contours of the surface 18 of the vehicle to which the mounting base 12 will be secured.

An adhesive 30 disposed on the mounting surface 24 facilitates securely bonding the mounting base 12 to the vehicle surface 18. In the embodiment shown, the adhesive 30 comprises a double-sided adhesive tape coupled with the mounting surface 24, however, other embodiments may comprise adhesive in various other forms. The double-sided adhesive tape may include a protective layer (not shown) opposite the flange 26 of the mounting base 24 for protecting the adhesive 30 prior to use, as is known in the art.

The insert body 20 includes a threaded bore 32 extending along the central axis 28 of the mounting base 12 and has an open end 34 generally opposite the mounting surface 24. The fixation assembly 10 further includes a fastener 14 having external threads 36 complementary to the threaded bore 32, whereby the fastener 14 may be threadably received in the threaded bore 32 to secure the component 16 to the vehicle as will be described below. In the embodiment shown, the fastener 14 is a bolt having a socket 38 that facilitates turning the bolt within the threaded bore 32 using a suitable tool. It will be appreciated that various other fasteners suitable for engaging the threaded bore 32 of the insert body 20 may alternatively be used.

Figure 4A:
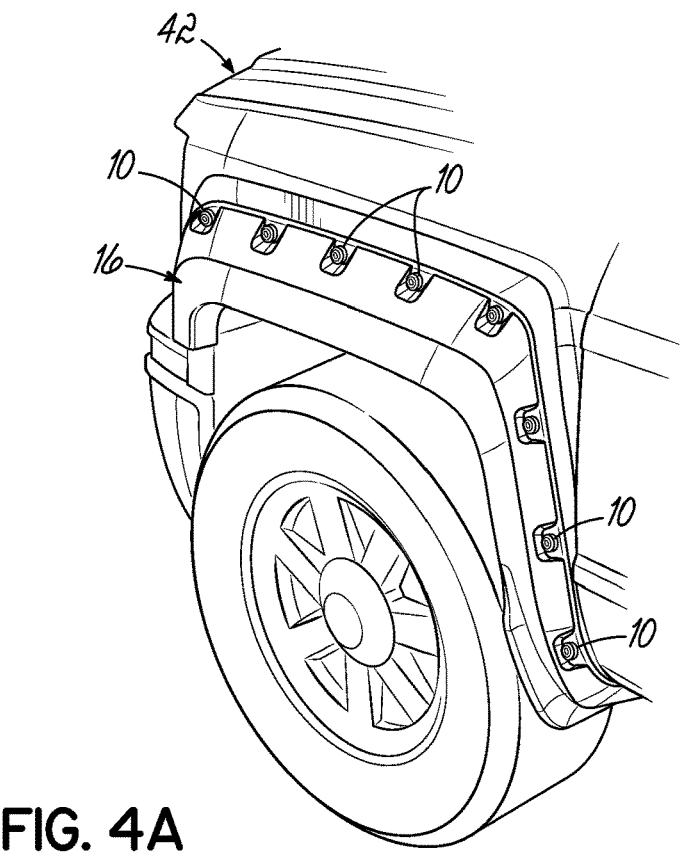
FIG. 4A-4B are a perspective views illustrating use of fixation assemblies of FIG. 2 used to secure a fender flare to a vehicle.
Figure 4B:
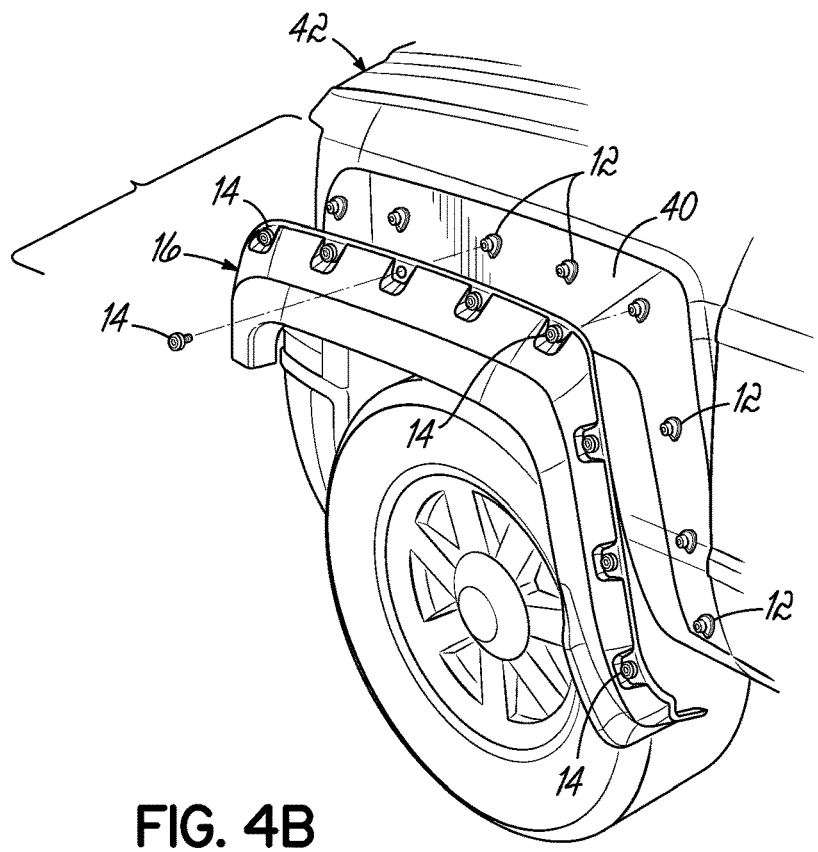

With continued reference to FIGS. 1 and 2, and referring further to FIGS. 4A-4B, a fixation assembly 10 in accordance with the principles of the present disclosure may be used to join a component 16 to the surface of a portion of a vehicle. In the embodiment shown, the component 16 is a fender flare which is to be joined to the surface of a fender portion 40 of a vehicle 42. In use, the fixation assembly 10 is affixed to the surface of the fender portion 40 of the vehicle 42 by positioning the mounting base 12 at a desired location on the vehicle 42 and adhering the mounting base 12 to the surface of the vehicle 42 with the adhesive 30 by pressing the mounting surface 24 firmly in contact with the vehicle surface. When the adhesive 30 comprises a double-sided adhesive tape, as in the illustrated embodiment, the adhesive 30 may be exposed by removing the protective layer from the tape. Improved adhesion results may be obtained when the surface of the vehicle 42 is cleaned prior to bonding the mounting base 12 to the vehicle 42.

In the embodiment shown in FIGS. 1, 2, and 4A-4B, the fender flare (component 16) comprises a recess 44 proximate the location where the fender flare 16 is to be coupled with the fixation assembly 12. An aperture 46 through the fender flare 16 is sized to receive the fastener 14 therethrough. After the mounting base 12 has been bonded to the surface of the vehicle 42, the fender flare 16 may be positioned adjacent the mounting base 12 such that the aperture 46 is aligned with the threaded bore 32 of the mounting base 12. The fastener 14 is then inserted through the aperture 46 and threadably engaged with the threaded bore 32, for example using a suitable driving tool, to thereby tighten the fastener 14 securely within the mounting base 12. If the component 16 to be mounted to the vehicle 42 requires additional fixation assemblies 10, corresponding mounting bases 12 may be adhered to the surface of the vehicle 42 at appropriate locations, and the component 16 may be secured at those locations with respective fasteners 14 in the manner described above.

Figure 5A:
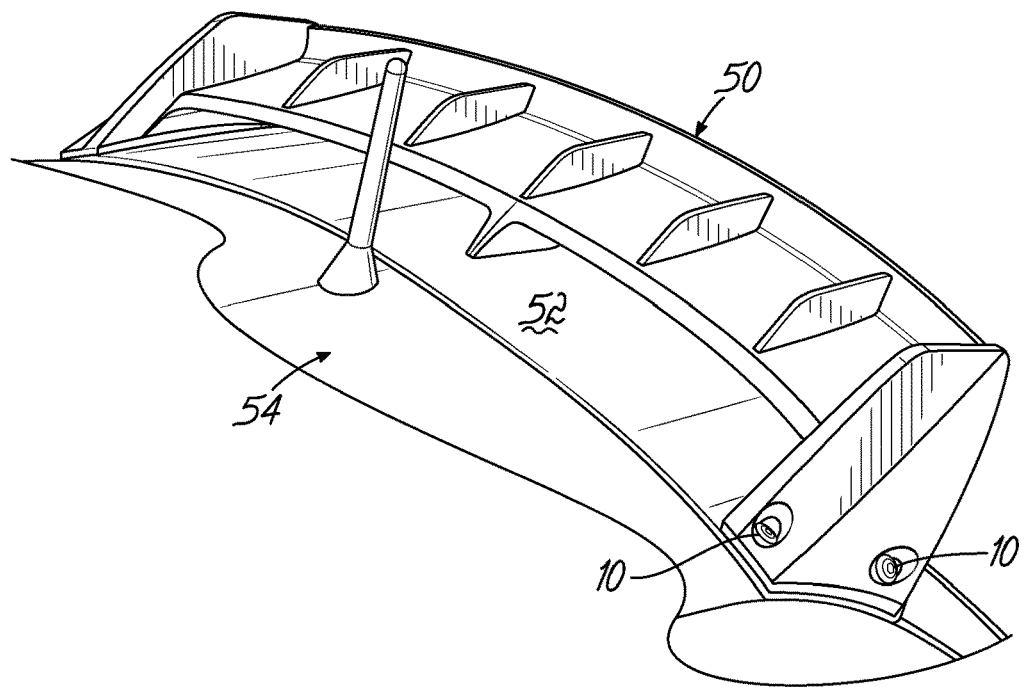
FIG. 5A-5B are a perspective views illustrating use of fixation assemblies of FIG. 2 used to secure a wing spoiler to a vehicle.
Figure 5B:
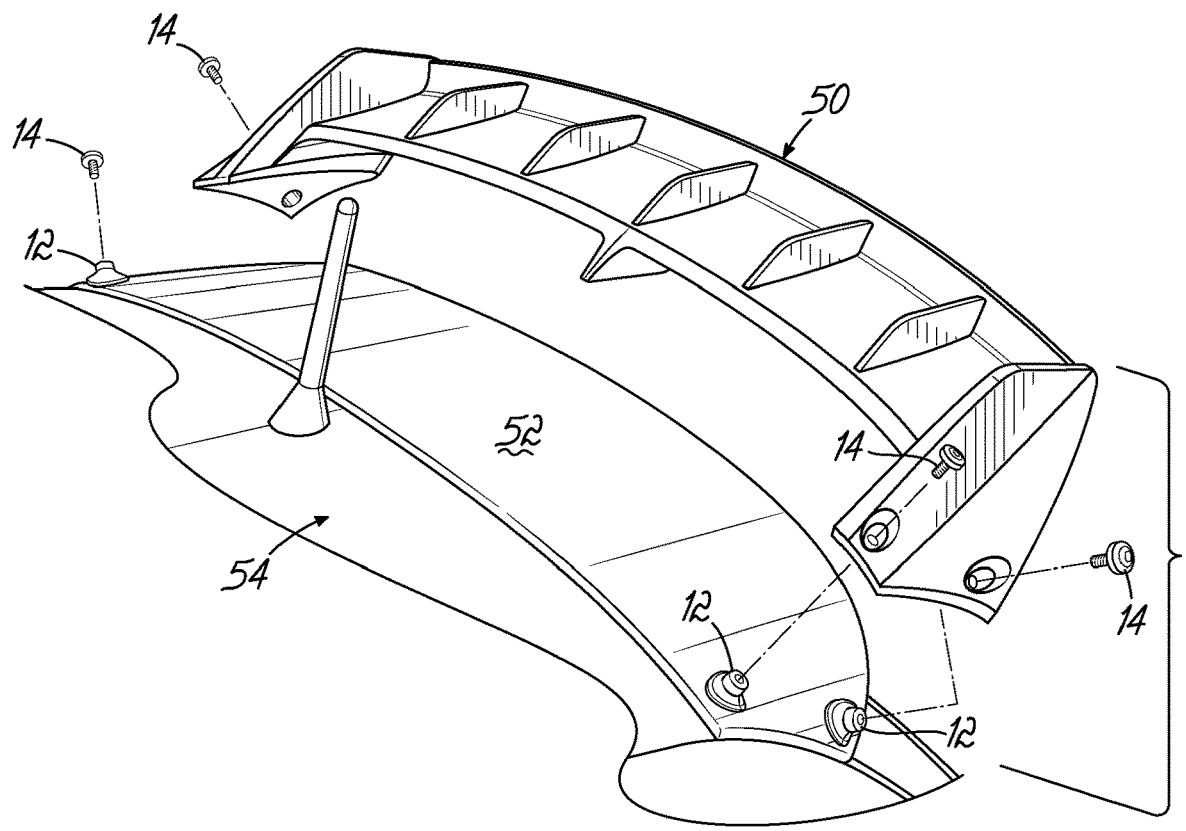
Figure 6:
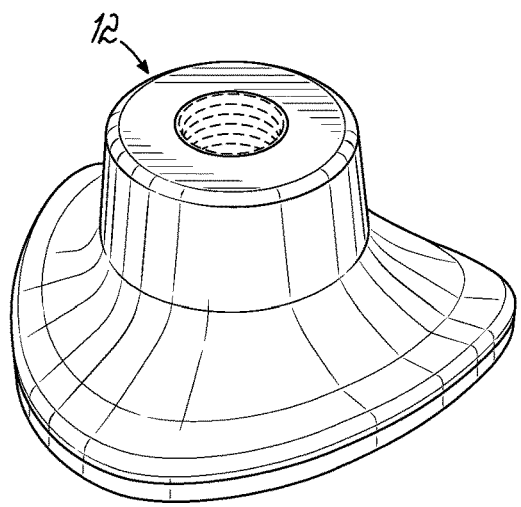
FIGS. 6-10 depict various views of the ornamental design of the mounting base of the exemplary fixation assembly of FIG. 2.
Figure 7:
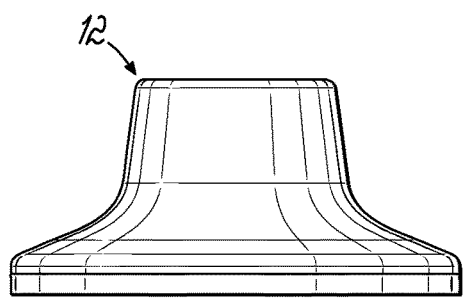
Figure 8:
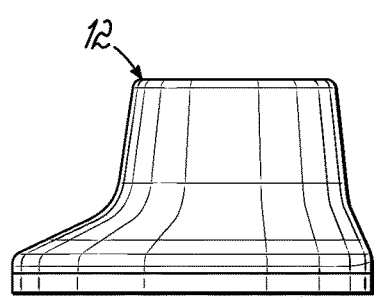
Figure 9:
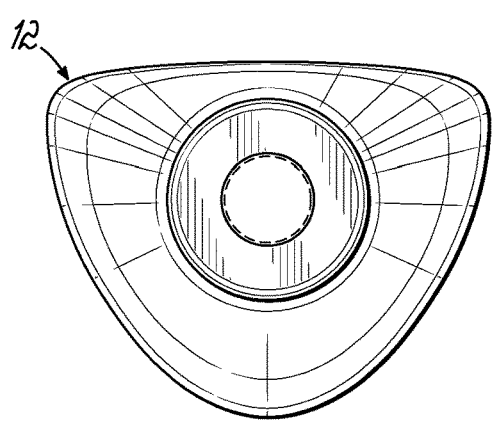
Figure 10:
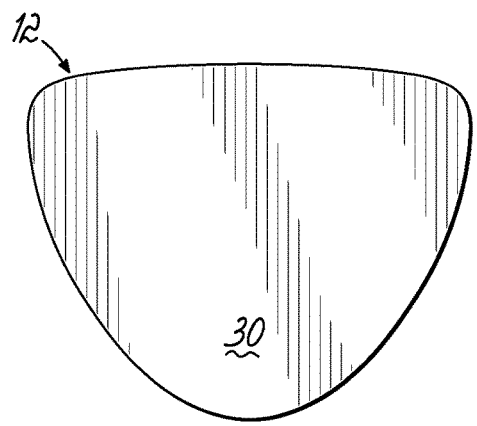
Figure 11:
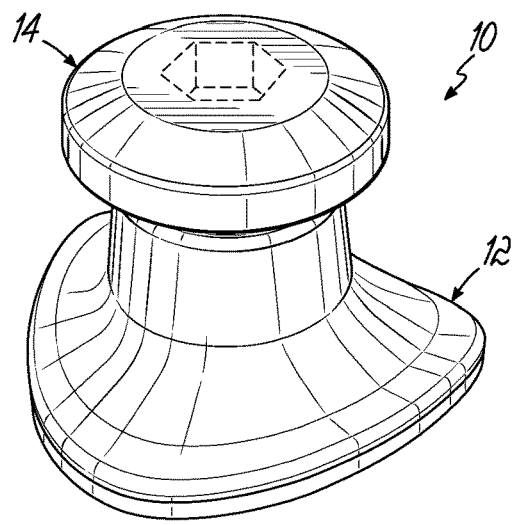
FIGS. 11-15 depict various views of the ornamental design of the exemplary fixation assembly of FIG. 2.
Figure 12:
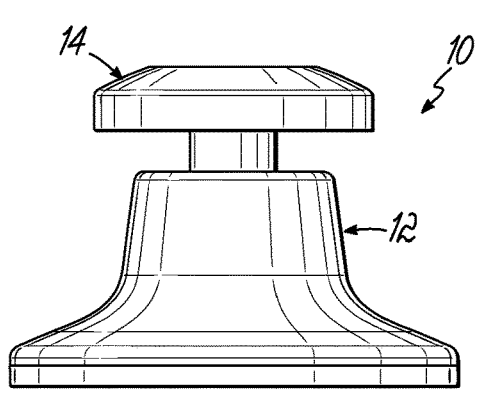
Figure 13:
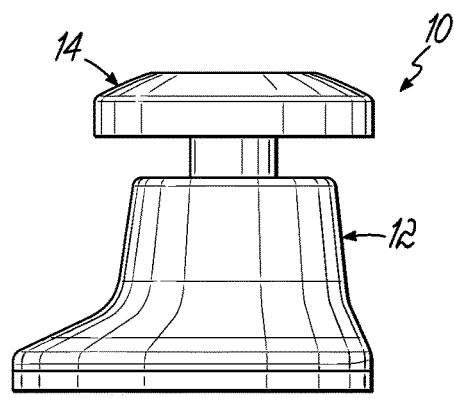
Figure 14:
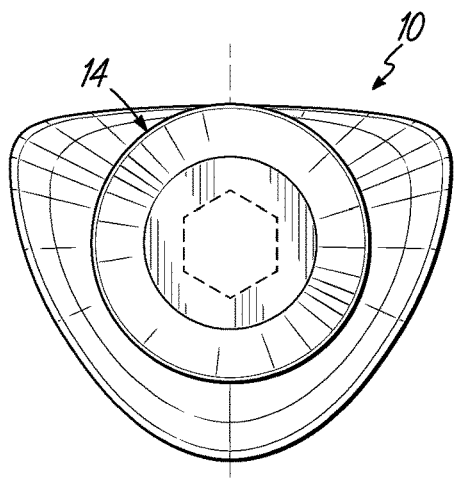
Figure 15:
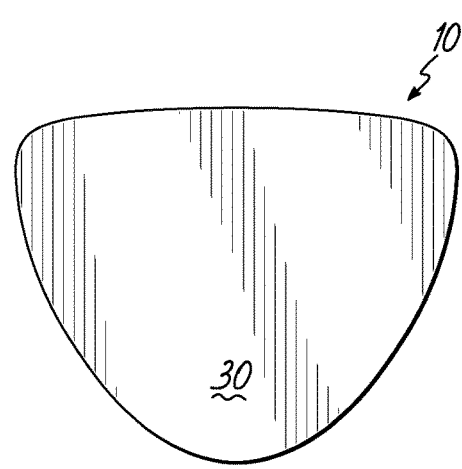

FIGS. 5A-5B illustrate another exemplary embodiment wherein a component 50 in the form of a wing spoiler is fixed to a surface 52 of a vehicle 54 using the fixation assembly 10 described above. While the exemplary fixation assembly 10 has been shown and described herein for use in securing various components to exterior surfaces of a vehicle, it will be appreciated that the fixation assembly 10 may alternatively be used to secure components to interior surfaces of a vehicle. Moreover, the fixation assembly 10 may alternatively be used to secure components to various other surfaces besides vehicle surfaces, such as when it is desired to join two objects without the need to drill holes in the objects.

FIGS. 6-10 and 7-15 illustrate various views of the ornamental design of exemplary embodiments of a fixation assembly 10 in accordance with the principles of the present disclosure.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. Various features shown and described herein may be used individually or in any combination. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A system for affixing a component to a surface of a structure, the system comprising:
   a fixation assembly, comprising:
   an insert body having a threaded bore, the insert body including a first flange, a first columnar body, a protrusion extending from the insert body, a second columnar body, and a second flange, the protrusion enclosed in the enclosure and configured to inhibit the insert body from rotating within the enclosure, an enclosure at least partially surrounding said insert body and defining a mounting surface, an adhesive disposed on said mounting surface, and a fastener having external threads complementary to said threaded bore; and a component having at least one aperture;

said fastener received through said aperture and threadably received in said threaded bore when said mounting surface is adhered to the surface of the structure with said adhesive to thereby affix said component to the structure.

2. The apparatus of claim 1, wherein said enclosure comprises polymeric material surrounding at least a portion of said insert body.

3. The apparatus of claim 2, wherein said polymeric material is molded around at least a portion of said insert body, thereby mechanically locking said insert body with said enclosure.

4. The system of claim 1, wherein said adhesive comprises a double-sided adhesive tape disposed on said mounting surface.

5. The apparatus of claim 1, wherein said mounting surface is conformable for engagement with a curved surface of the structure.

* * * * *